(No Model.) 2 Sheets—Sheet 1.

R. EICKEMEYER.
ALTERNATING CURRENT MOTOR.

No. 541,604. Patented June 25, 1895.

Attest:
Philip F. Larner
Howell Battle

Inventor:
Rudolf Eickemeyer
By M. B. Pood
Attorney (No Model.) 2 Sheets—Sheet 2.
R. EICKEMEYER.
ALTERNATING CURRENT MOTOR.
No. 541,604. Patented June 25, 1895.
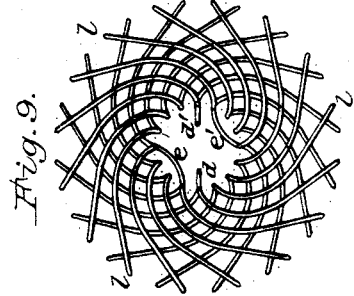
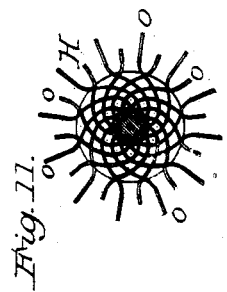
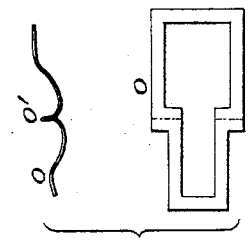
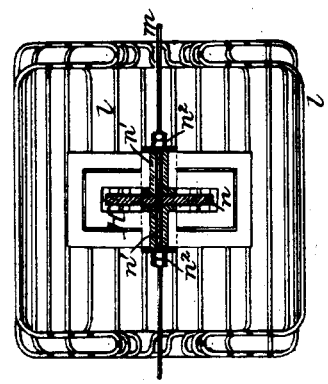
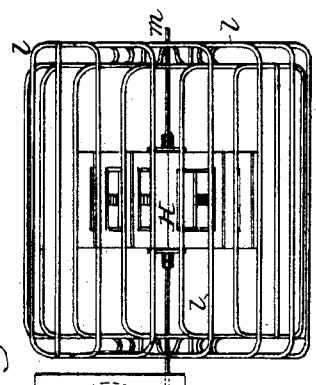
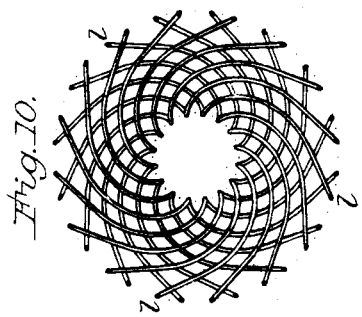
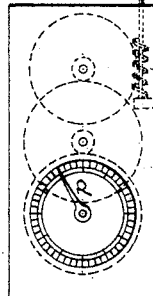
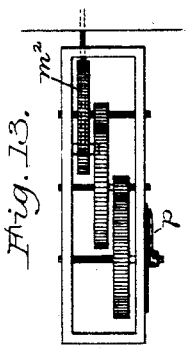
Attest:
Philip F. Larner
Howell Battle
Inventor:
Rudolf Eickemeyer
By M. C. Wood
Attorney.

UNITED STATES PATENT OFFICE.

RUDOLF EICKEMEYER, OF YONKERS, NEW YORK.

ALTERNATING-CURRENT MOTOR.

SPECIFICATION forming part of Letters Patent No. 541,604, dated June 25, 1895.

Application filed September 23, 1891. Serial No. 406,574. (No model.)

*To all whom it may concern:*

Be it known that I, RUDOLF EICKEMEYER, of Yonkers, in the county of Westchester and State of New York, have invented certain new and useful Improvements in Alternating-Current Motors; and I do hereby declare that the following specification, taken in connection with the drawings furnished and forming a part of the same, is a clear, true, and complete description of my invention.

The main object of my invention, is to produce simple and efficient alternating current motors, which can be operated by such single currents as are afforded by ordinary lamp circuits, and my improvements are quite widely applicable, including such light service motors, as are suitable for use in electric meters, for measuring alternating currents, or for indicating and recording pressures in such circuits.

In machines embodying my invention, there is a novel system of field exciting conductors, circularly arranged and all connected in series, whether each of said conductors involve only a single turn, (as used by me in light duty motors for service in meters,) or many turns, in the form of a single closed circuit coil, constructed in sections, as used by me in motors for ordinary service. With these field exciting conductors I generally employ magnetic metal in the field, but this is not always necessary, as for instance in meters. These field exciting sections being connected in series, are mainly excited by one alternating electric current which directly induces a magnetic field or fields from certain of said sections in definite groups, but others of said sections, also in groups, are shunted upon themselves, so that in these short circuited sections, or groups of sections, another alternating current is induced which differs in phase from the current in the directly excited sections or groups, and these two currents by their combined action, but operating in successive order, cause a rotation of the line of magnetization, and a consequent rotation of the movable element of the motor, whether said element be the armature, or the field magnet.

After describing my invention in connection with the accompanying drawings, the features deemed novel, will be duly specified in the clauses of claim hereto annexed.

Figure 1:
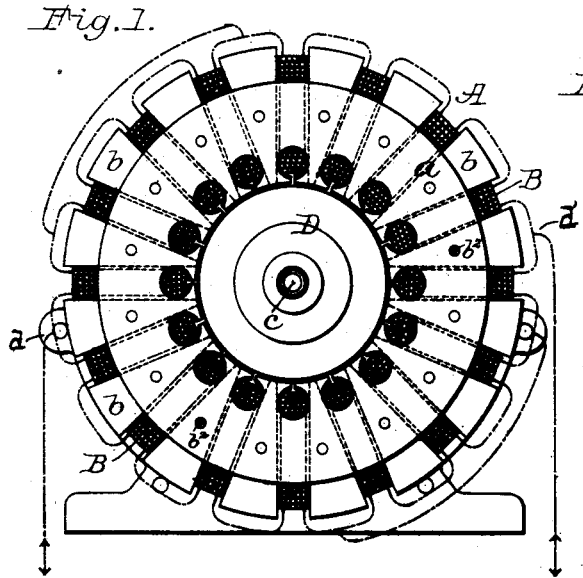
Figure 2:
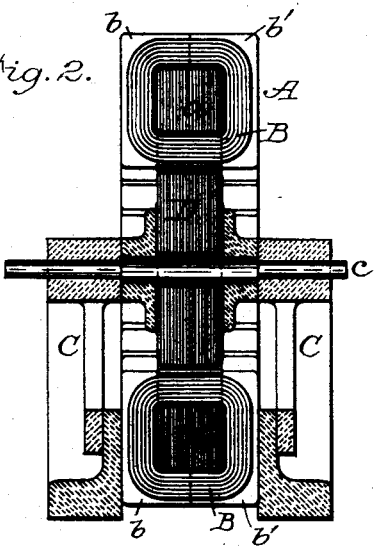
Figure 4:
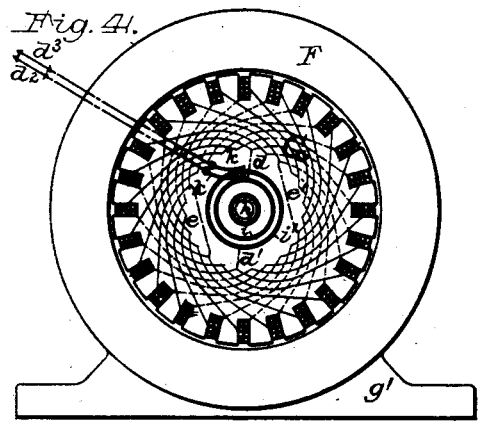
Figure 5:
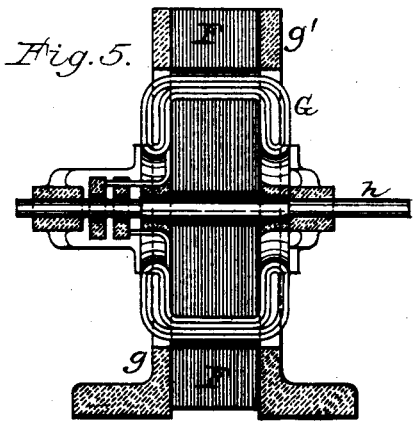
Figure 6:
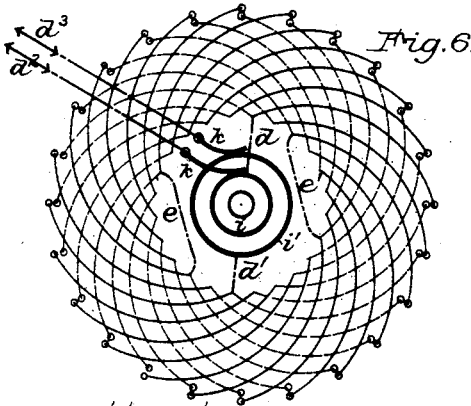
Figure 3:
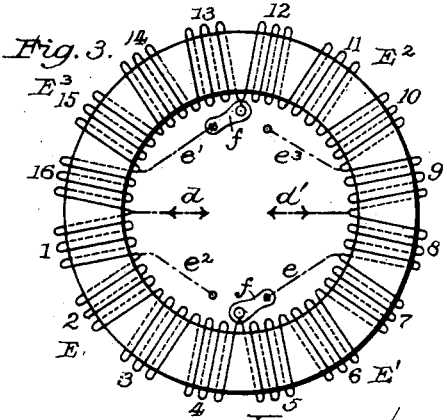

Referring to the drawings, Figures 1, 2, and 3, in appropriate sections and diagram, illustrate an alternating-current motor embodying my invention, and in which the field magnet is stationary and the armature rotative. Figs. 4, 5, and 6, in similar sections and diagram, illustrate one of my motors, in which the field magnet is rotative. Fig. 7 illustrates one of my motors as embodied in a meter. Fig. 8 is a sectional view of the motor of Fig. 7. Figs. 9 and 10 are respectively end and sectional views of the field-coil of said motor. Fig. 11 is an end view of the armature. Fig. 12, in edge and plan views, illustrates one of the armature conducting arms or plates. Fig. 13 illustrates the train of gearing between the motor-shaft and the indicating finger or needle of the meter.

I will first describe the motor shown in Figs. 1, 2, and 3.

The field magnet A, has a laminated iron ring $a$, for its core, and near its interior line, the ring is laterally drilled or recessed to afford seats for the reception of the field exciting conductors, which in this case, are the several circularly arranged sections or divisions of the field coil B. These coil sections, of which there are sixteen, in this machine, are radially disposed, and are confined in place by means of non magnetic or wooden blocks, $b$, $b'$, which not only conform to three sides of the ring $a$, but also to the angular spaces between the coil sections, and they are firmly clamped, by means of insulated bolts $b^2$, each extending through two blocks and the core, thus also firmly binding the metal plates, of which the core is composed. The magnet is supported in a non magnetic frame, composed of side pieces C, C, some of the bolts $b^2$, being long enough to extend through said frame pieces, and the frame also affords suitable supports for the bearings of the shaft $c$, of the armature D, which in this case, is a plain drum or core of laminated iron. The annular space between the armature and the iron ring $a$ involves the usual resistance in the magnetic circuits, but this is reduced as far as possible, by housing the inner portions of the field coil sections in the ring as described, each annular recess in the ring, having a slot or opening for facilitating the coiling of the wire. The sixteen coil sections are connected in continuous series, and constitute one continuous coil, as clearly indicated in Fig. 3, and feeding or supply terminals, are provided at diametrically opposite points, as at $d, d'$, for connection with an alternating current circuit. Commencing at the terminal $d$, the coil sections are numbered from 1 to 16, consecutively, so that coils 1 to 8, inclusive are in this instance, below said terminals, and coil sections 9 to 16 inclusive, above; but coil sections 5, 6, and 7, are short circuited by conductor $e$, over which the supplied current is shunted, and in like manner, the conductor $e'$, shunts coil sections 13, 14, and 15. These groups of sections shunted upon themselves are unsymmetrically disposed with respect of the supply terminals $d, d'$, and the sections of the coil are divided into four groups; sections 1, 2, 3 and 4 being in one group E, opposite the group $E^2$, which contains sections 9, 10, 11, and 12, and intervening with these, are the two shunted groups $E'$, and $E^3$, respectively containing coil sections 5, 6 and 7, and sections 13, 14 and 15.

The diametrically opposite arrangement of the feeding or supply terminals here shown, is appropriate to a two phase motor; but, regardless of the number of supply terminals, as well as of their position with relation to each other, the shunted groups of coil sections, are always unsymmetrically disposed with relation to the supply terminals, which in all cases, would be appropriately separated.

The alternating current excites in the magnetic circuits of the coil sections of group E, and in sections of group $E^2$, corresponding phases of magnetism, but said current being shunted around the groups $E'$, and $E^3$, there is induced in the coil sections of said shunted groups, an exciting current, so far differing in phase, from the phases of current directly supplied to the groups E, and $E^2$, that said two currents, co-operating, cause a rotative shifting of the line of magnetization, and a consequent rotation of the armature.

As thus far described, the motor can only be driven in one direction, and for rendering it reversible, I have devised a system of shunt switching, which is illustrated in Fig. 3. As here shown, the shunting conductors $e$ and $e'$, terminate at one end, at posts or plates, with which the two keys $f$, are in contact, said keys at their pivotal points, being in electric connection with the field coil at points between sections 4, and 5, and 12 and 13. Other shunting conductors $e^2$, and $e^3$, are also provided by means of which, sections 2, 3 and 4, as well as sections 10, 11, and 12 may be shunted, if the keys $f$, be swung around into contact with the posts which serve as outer terminals of the said shunting conductors $e^2$, and $e^3$, thus providing for a reversal of the relative positions of the shunted sections, and a consequent reversal in direction of the line of magnetization.

In machines having a rotative magnet, I employ substantially the same arrangement of the field coil in sections, and also the same shunted, and non shunted groups; as, for instance, as illustrated in Figs. 4, 5 and 6. In this machine, a laminated iron ring F, serving as an armature, is firmly mounted between frame plates $g$, and $g'$, of non magnetic material, and affording supports for the bearings of the shaft $h$, on which the magnet G, revolves. The core of this magnet, is composed of laminated iron, in the form of a drum, or cylinder, and having its periphery longitudinally recessed for the reception of field exciting coils, much after the manner of toothed armatures of the Pacimotti type, for machines of low resistance. These circularly arranged exciting coils, are all connected in series, and constitute one continuous coil, as before described, and these have also similar diametrically opposite connections $d, d'$, for the reception of the alternating current, as shown in Fig. 6; but in this case, each terminal has on the shaft of the magnet, a contact ring $i$, $i'$, with which brushes $k, k$, engage, the latter being connected with the outside feeding conductors $d^2$, and $d^3$, these being also shown in Fig. 4. The field coil sections, in this machine, are twenty-four in number, and they are divided into groups, as before described, portions of the sections being short circuited, or shunted upon themselves, by the shunt conductors $e$ and $e'$, these shunted groups being unsymmetrically located with reference to the feeding terminals as in the first machine. The combined exciting action of the current in the non shunted, and of the induced current in the shunted sections, of the coil, causes the line of magnetization in the magnet core to be rotated, and the attraction of the opposite polarization induced in the armature, results in rotation of the magnet, from the shaft of which, power may be communicated, as by a belt pulley, or gearing.

Motors for light duty, as for service in meters need have no magnetic metal in conjunction with field exciting conductors; and instead of the coils, I employ conductors in sections composed of a single turn, each and all connected in series, for inducing the magnetic field, as illustrated in Figs. 7 to 10, inclusive, wherein a cage-like structure of single turn sections, or conductors, is shown. These conductors $l$, are of insulated wire, and bent into predetermined shape, as clearly indicated, and assembled into the cylindrical form shown, so that at one end, they will be as illustrated in the sectional view Fig. 10, and at the opposite end, as shown in the end view Fig. 9. The sides of the conductors are clearly indicated in Figs. 7 and 8, a short side of one field section or conductor, intervening between the long sides, of each two sections. As shown in Fig. 9, there are two diametrically opposite feeding terminals $d$, and $d'$, and portions of the field conductors are short circuited by the shunt conductors $e$, and $e'$, substantially as before described, and consequently, the combined action of the currents in the non shunted, and shunted portions, of the exciting conductors or sections, rotate the line of magnetization, as already described, and cause the rotation of the armature H.

The armature may be widely varied in its construction, and components, but as here shown, it is composed of a series of close circuited conductors, freely inclosing an iron disk, and all rotative together. The armature shaft $m$, carries an iron disk $n$, preferably laminated and two copper hubs $n'$, $n'$, clamped upon the shaft between two nuts $n^2$. The armature conductors $o$, are cut from sheet metal, into plates of the form indicated in plan view in Fig. 12, each having an interior rectangular space, wider at one end than at the other, and with a corresponding variation in exterior dimensions, the outside lateral dimensions of one end being smaller than the inside dimensions of the other end. This plate is bent flatly upon itself, as at $o'$, $o'$, thus forming flat arms at the one side of the middle, the remainder, or two ends of the plate, being bent in two evolute lines, as indicated in the edge view of Fig. 12, and also in Fig. 11. These plates, constitute closed circuit armature conductors, the arms $o'$, being soldered into slots in the two copper hubs $n'$, $n'$, and when assembled around the iron disk $n$, the long wide arms alternate with the short narrow arms, as clearly indicated in Fig. 11. The armature shaft $m$, carries a worm $m'$, which meshes with a worm gear $m^2$, and this in turn, is connected by a train of gearing, with the indicator needle or pointer $p$, as is clearly shown in Figs. 7 and 13.

Having thus described my invention, I claim as new and desire to secure by Letters Patent—

1. In an alternating electric current motor, field exciting conductors, organized substantially as hereinbefore described, said conductors being circularly arranged in sections which are all connected in series, and have at appropriately separated points, connections for receiving a supplied alternating electric current, certain of said sections being shunted upon themselves in groups which are unsymmetrically located with reference to the electric supply connections, whereby all of the sections afford a circuit for the supplied current, and the non shunted sections are directly excited by said supplied current, with corresponding phases of magnetism, and in the shunted sections, electric currents induced which afford phases of magnetism, differing from the phases of magnetism induced by the non shunted sections, for causing rotation of the line of magnetization.

2. In an alternating current motor, the combination substantially as hereinbefore described, of an armature, suitable field metal, and a continuous magnetizing coil having diametrically opposite connections for receiving an alternating electric current, portions of said coil opposite each other, but unsymmetrically located with reference to the current feeding connections, being shunted upon themselves as described, said coil when excited by an alternating electric current, affording phases of magnetism, at the non-shunted portions, which differ from the magnetic phases afforded by the induced currents set up in the shunted portions, and cause a rotation of the line of magnetization.

RUDOLF EICKEMEYER.

Witnesses:
CHARLES STEINMETZ,
H. RYDGUIST.